United States Patent [19]
Wilken-Trenkamp

[11] Patent Number: 5,650,067
[45] Date of Patent: Jul. 22, 1997

[54] SUPPORTING PLATE FOR A FILTER

[75] Inventor: Ludger Wilken-Trenkamp, Havixbeck, Germany

[73] Assignee: Wil-Man Polymer-Filtration GmbH, Wettringen, Germany

[21] Appl. No.: 404,630

[22] Filed: Mar. 14, 1995

[30] Foreign Application Priority Data

Dec. 19, 1994 [DE] Germany ............... 44 45 254.3

[51] Int. Cl.$^6$ ...................................... B01D 29/05
[52] U.S. Cl. ................... 210/401; 210/498; 29/896.61; 425/197
[58] Field of Search .................. 425/197, 199; 210/401, 402, 411, 415, 498; 29/163.6, 163.8, 896.61

[56] References Cited

U.S. PATENT DOCUMENTS

| | | |
|---|---|---|
| 3,018,807 | 1/1962 | Clinefelter . |
| 3,938,925 | 2/1976 | Robert . |
| 4,228,330 | 10/1980 | Strub ............... 210/498 |
| 4,442,002 | 4/1984 | Morris ............... 210/411 |
| 4,957,630 | 9/1990 | Bratten ............... 210/402 |
| 5,346,383 | 9/1994 | Starnes . |

FOREIGN PATENT DOCUMENTS

| | | |
|---|---|---|
| 2175974 | 10/1973 | France . |
| 1800169 | 4/1970 | Germany . |
| 2339057 | 2/1974 | Germany . |

OTHER PUBLICATIONS

Patent Abstracts of Japan, vol. 16, No. 177, Apr. 28, 1992, Publication No. JP 4018322.

*Primary Examiner*—W. L. Walker
*Attorney, Agent, or Firm*—Meltzer, Lippe, Goldstein et al.

[57] ABSTRACT

A supporting plate is described for a filter in a fluid filter device, said filter being essentially perpendicular to the flowing direction of the fluid, said supporting plate containing a large number of holes which pass from the front side of the plate to the rear side. Each hole (8) provides in the area of the front side (6) and/or in the area of the rear side (7) a distal section (16, 17) which is increased relative to the smallest cross-section of the hole (8), whereby this distal section (16, 17) is of such a shape, that the total surface of the edges (13, 14) between the holes (8) is decreased.

14 Claims, 4 Drawing Sheets

SUPPORTING PLATE FOR A FILTER

FIELD OF THE INVENTION

The present invention relates to a supporting plate (disk) for a filter in a fluid filter device.

BACKGROUND OF THE INVENTION

Supporting plates (disks) for filters are known in differing forms and are technically used since a long time. Such supporting plates have the effect, that a filter, placed in a fluid stream essentially basically perpendicular to the stream direction is secured and supported by the plate, so that the position of the filter is even then unchanged, when the fluid to be filtered, for instance a liquid or a molten polymeric material, passes the filter with a high flow speed.

It is a known arrangement in filter devices, in particular for the filtration of molten polymeric material, that they contain in the flow direction of the fluid to be filtered a supporting plate, a filter adjacent to the supporting plate, which filter is itself in direct contact with a filter distance plate, whereby usually a perforated plate is assigned to this filter-sandwich, constituting a support arrangement with the result, that the filter sandwich is secured safely in the fluid stream during the filtration procedure of the fluid, with particles separated from the fluid, by diverting the direction of the fluid stream by appropriate guidance or control elements in such a manner, that the fluid stream passes the filter device in the reverse direction. In this manner the fluid stream first passes the perforated plate, then the distance plate and hereafter the supporting plate, whereby the filter is secured in its position by the supporting plate in this reversible flow position as well. It is further a known method to regenerate the known filter devices, in particular such filter devices which are arranged as described before, when such filters are covered.

The filter devices known in the art and described above, contain a large number of holes, whereby these holes are shaped as cylindrical bores in the about 2 mm to about 15 mm thick support plate.

It is a special disadvantage of the known supporting plate, that the filter is clogged quickly in particular in the region of the holes by filtered-off particles, which requires a regeneration of the filter after a fairly short time of exposure.

SUMMARY OF THE INVENTION

It is an aim of the present invention to provide a supporting plate of the indicated type, which provides a particularly long exposure time between two regeneration cycles.

This aim is achieved by a supporting plate for a filter in a fluid filter device, said filter being essentially perpendicular to the flowing direction of the fluid, said supporting plate containing a large number of holes which pass from the front side of the plate to the rear side. Each hole (8) provides in the area of the front side (6) and/or in the area of the rear side (7) a distal section (16,17) which is increased relative to the smallest cross-section of the hole (8), whereby this distal section (16,17) is of such a shape, that the total surface of the edges (13,14) between the holes (8) is decreased.

The inventive supporting plate for a filter in a fluid filter device, said filter being arranged essentially perpendicular to the streaming direction of the fluid, contains just like the previously described known supporting plates a large number of holes. These holes pass from the front side of the supporting plate to the rear side of the supporting plate. The front side of the supporting plate is that area of the supporting plate, which first contacts the fluid to be filtered, viewing in the flow direction of the fluid to be filtered. The rear side of the supporting plate is the area which is, relative to the front side, on the other side of the plate, showing in the direction of the filter. Each hole of the inventive plate provides in the area of the front side and/or in the area of the rear side a distal section which is increased relative to the smallest cross-section of the hole. In this way the total surface of the edges between the holes is decreased. Edges in the context of the present invention represent those structures, which are generated by the convergence of two side walls of adjacent holes, such structures normally constituting a boundary line. If a certain part of these side walls of the holes constituting the edge is removed, the remaining structure between the holes will be designated as portion of edge in the context of the present invention.

The inventive supporting plate(disk) provides a number of advantages. It is one advantage, that, when using the inventive supporting plate, the filter is not rapidly clogged due to separated particles in the area of the holes. This is due to the fact, that the edge area is decreased in the inventive supporting plate and accordingly, the distal sections of the holes are increased. Dead zones in the stream are avoided almost completely by the use of the inventive supporting plate. This has the effect, that almost the complete surface of the filter is available for the actual filtering operation and this fact explains the significantly increased exposure time between two regeneration cycles.

Furthermore it is an effect of the increased distal sections present at the front side or the rear side or on both sides, that the flow conditions of the fluid to be filtered are changed within the holes and immediately downstream from the supporting plate. The consequence of this is, that the inventive supporting plate builds a substantially decreased resistance compared with conventional supporting plates. Again this leads to an increased perfusion capacity and therefore an increased production performance.

Due to the above-described decrease of the surface of the edges (web parts) and the associated increase of the areas of the distal sections of the holes, it is a further advantage of the inventive supporting plate, that a reverse washing of the filter by a diversion of the direction of the fluid stream can be performed in a much quicker manner and in a much more effective way. The filter is in this operational mode adjacent to the supporting plate and supported and secured by it in a particularly effective and safe manner. Such a regeneration of the filter device is not possible with supporting plates from the prior art, since due to the pressure exercised by the flowing liquid, relatively large parts of the filter space are pressed against the edges which are present between the cylindrical holes and consequently these filter parts are not or not sufficiently regenerated.

The previously described advantages are particularly apparent, when all holes of the inventive supporting plate comprise the above-described increased distal section on the front side as well as on the rear side of the supporting plate.

According to a first embodiment of the inventive supporting plate the edges between the increased distal sections of the holes have the shape of portions of edges. Consequently not the edges themselves, but only the portions of edges are in contact with the filter and secure it. In other words, the supporting plate contains according to this embodiment at the outer surface of the front side or the rear side or on both sides only portions of edges. These portions of edges keep the filter in place and secure it in particular then, when the filter is washed by the reversion of the streaming direction of the fluid to be filtered. In this operational mode the filter is pressed against the portions of edges at the rear side of the supporting plate. It was surprisingly observed, that a relatively small supporting surface made up from the total of the portions of edges is sufficient to support the filter and keep it safely in place also in the reverse washing position, without any damage being inflicted to the filter.

It is a particularly appropriate embodiment of the inventive supporting plate, when the before-described edges or portions of edges, present between the increased distal sections of the holes, provide a total surface at the level of the front side, or the rear side or of both sides, which is between 30% and 2%, relative to the total surface of the front side or rear side. In particular when the before-mentioned total surface of the edges or the portions of edges lies between 15% and 5% of the total surface of the front side or the rear side or of both sides, then it is possible to achieve particularly long exposure times of the filter during the filtration without any damage to the filter. In such an embodiment of the inventive supporting plate, the operational capacity for the fluid to be filtered per unit of time is substantially increased, compared with a conventional supporting plate, in particular by a factor of 1.2 to 1.6. This is a consequence of the phenomenon that on the one hand the flow conditions in each hole are improved and optimised and on the other hand the resistance caused by the supporting plate is markedly reduced compared with a conventional supporting plate.

Particularly long exposure times of the filter in filtering mode are observed in such modifications of the above-described embodiments of the inventive supporting plate in which the portions of edges provided at the level at the front side or the rear side or on both sides possess a triangular base area. According to this modified embodiment the inventive supporting plate possesses the said triangular flattened base areas only at the outer surface of the front side or the rear side or on both sides. As a consequence the dead space in the fluid stream is reduced to a minimum value, which is very positive for the filtering performance of the filter and on the other hand no part of the filter is unperfused in the regeneration mode, and accordingly the total filter surface is regenerated completely.

A particularly suitable embodiment of the inventive supporting plate provides the presence of an increased distal section of each hole in the direction of the front side of the supporting plate in the shape of a truncated cone and an increased distal section in the direction of the rear side of the supporting plate in the shape of a truncated cone. The surface of the edges or the portions of edges between the holes is substantially reduced in this way and it is a further consequence, that there exist optimal flowing conditions within each hole. This is particularly obvious in fluids with a relatively high viscosity, for instance molten polymeric material, where it is positive observation, that a high perfusion capacity and a particularly low resistance can be achieved.

It is a further modification of the above-described embodiment of the inventive supporting plate that each hole of the inventive supporting plate is shaped in such a manner, that both smaller base surfaces of the two distal sections with the shape of a truncated cone form the hole by meeting each other. Each hole according to this modification has a geometrical shape as is constituted by two truncated cones placed on top of each other by their smallest base area.

It is another modification of the above-described embodiment of the inventive supporting plate, comprising cone-shaped distal sections in each hole, that a cylindrical middle section is arranged between the distal section in the shape of a truncated cone at the front side and the distal section at the rear side in the shape of a truncated cone. It is preferable, that the cylindrical middle section has a diameter which is identical with the smallest base surface of both cone-shaped distal sections. According to this embodiment the hole is shaped in a way as is achieved, when a cylinder is arranged between two truncated cones in such a manner, that the two circular front sections of the cylinder are contacting directly the smallest base surface of each of the truncated cones.

In order to achieve particularly optimal flowing conditions in the holes, it is recommendable to arrange the truncated cone of the distal section in the shape of a truncated cone in such a way, that the side lines of the truncated cone make an angle $\alpha$ between 50° and 70° and in particular an angle $\alpha$ of 60°.

It is obvious, that the inventive supporting plate can comprise holes of a different shape as in the above-described embodiments with the distal sections in the shape of a truncated cone. All different embodiments should contain the increased distal section described at the beginning and the decreased edge surface also described before. It is a further preferred embodiment to shape each hole in such a way, that it comprises viewed in flow direction of the fluid double-concave shaped side walls according to an axial and a central cut. This embodiment approaches with respect to the shape of the holes the above-described embodiment with the distal sections in the shape of a truncated cone, whereby both distal sections in the shape of a truncated cone directly contact each other in the area of the smallest base surface of the truncated cones.

It is a basic property of the inventive supporting plate, that it comprises a maximum number of holes. In particular when the supporting plate comprises a first row of holes immediately adjacent to the outer border of the supporting plate and when the other holes are arranged in such a manner, that each hole is surrounded by six other holes, then the supporting plate has an arrangement of the holes which warrants a particularly large number of holes in the supporting plate.

The general form of the inventive supporting plate is dependent on the form of the respective filter device. Preferably however, the inventive supporting plate has the shape of a polygon, in particular of a hexagon or a dodecagon, or the shape of a circle. These embodiments are particularly advantageous when the inventive supporting plates are arranged together with a filter, if needed a distance plate and/or a perforated plate within a piston-shaped filter device, as is for instance used for the filtration of molten polymeric material and is for instance described in the German patent application DE-AS 18 00 169.

As has been explained before, the inventive supporting plate is preferably used for securing a filter in a filter device belonging to an extruder for synthetic material and more particularly in such filter devices where the filter allows a filtration of the polymeric molten synthetic material in a first operational position and a regeneration of the filter in a second operational position, without the necessity to remove the filter.

According to a further, particularly suitable embodiment of the inventive supporting plate the inventive supporting plate comprises on its rear side directing to the filter at the level of the rear side essentially only triangular-like or triangular portions of edges and on its front side directed away from the filter only edges shaped like lines. This embodiment of the inventive supporting plate has the effect, that in particular during the washing procedure of the filter, the filter is supported effectively by the triangular portions of edges on the rear side, without the formation of any dead spaces in the stream, and that furthermore in particular when the fluid reaches the filter from this side, the edges in the shape of lines at the level of the front side by their knife-like shape guarantee a faultless and uniform distribution of the fluid stream over all holes.

BRIEF DESCRIPTION OF THE DRAWING

The inventive supporting plate is disclosed in the example with more details with reference to the accompanying drawings.

In FIGS. 1 to 4 the same parts are represented with the same symbols.

DESCRIPTION OF THE PREFERRED EMBODIMENTS

Apart from the supporting plate 1 which will be described in more detail in FIGS. 2 to 4, the filtering device shown in FIG. 1 in sectional view corresponds to a filtering device as is known for instance from DE-AS 18 00 169. Hereby the filtering device is arranged in a cylindrical piston 2, whereby this cylindrical piston 2 constitutes at the same time the housing for the filtering device.

During the filtration of a fluid stream, in particular when this fluid stream is a molten highly viscous polymeric material, this fluid stream is directed in the direction of arrow 3 through the filter device.

Figure 1:
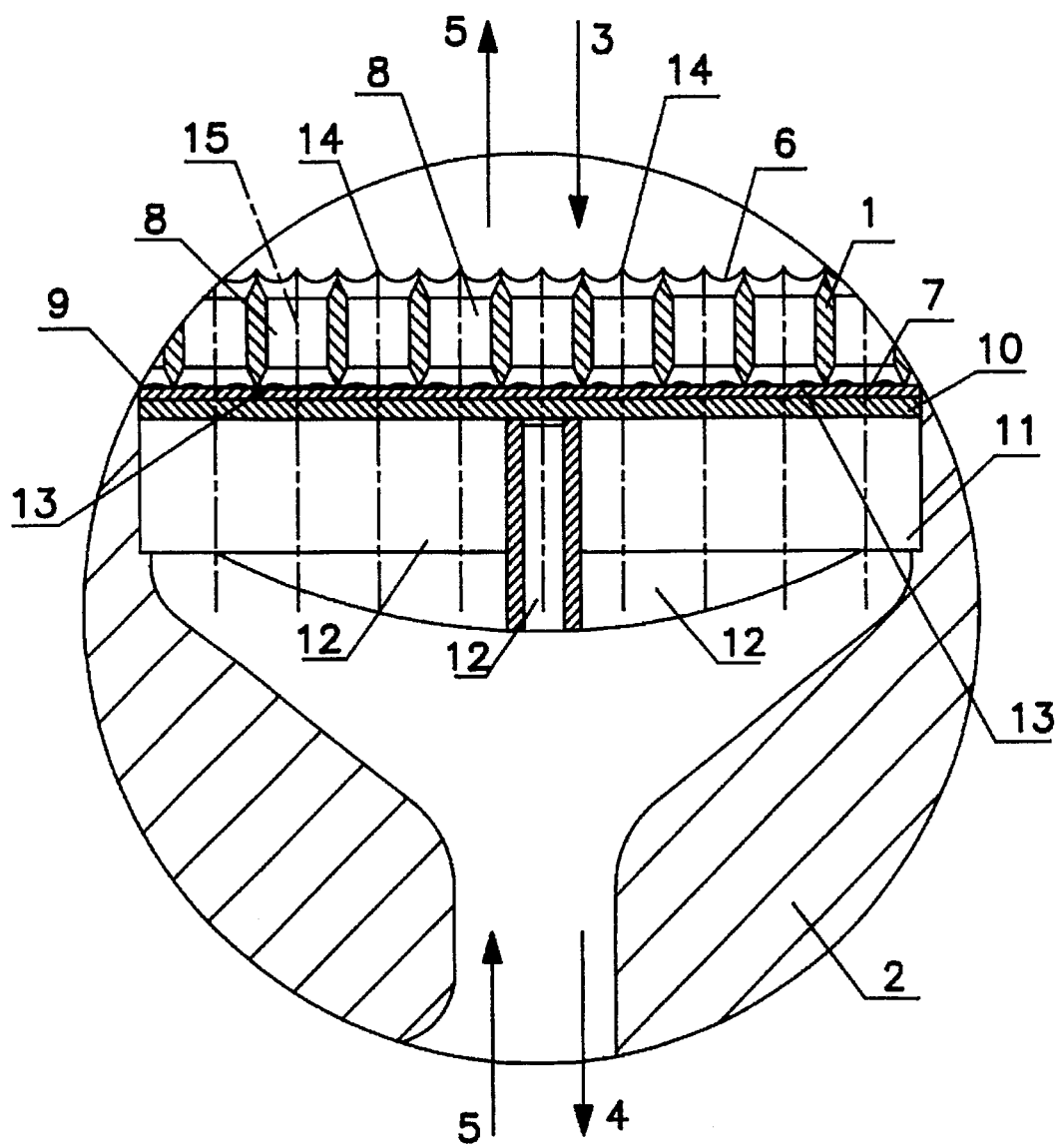
FIG. 1 a sectional view of a filtering device, which is provided in a piston-shaped filter housing.
Figure 2:
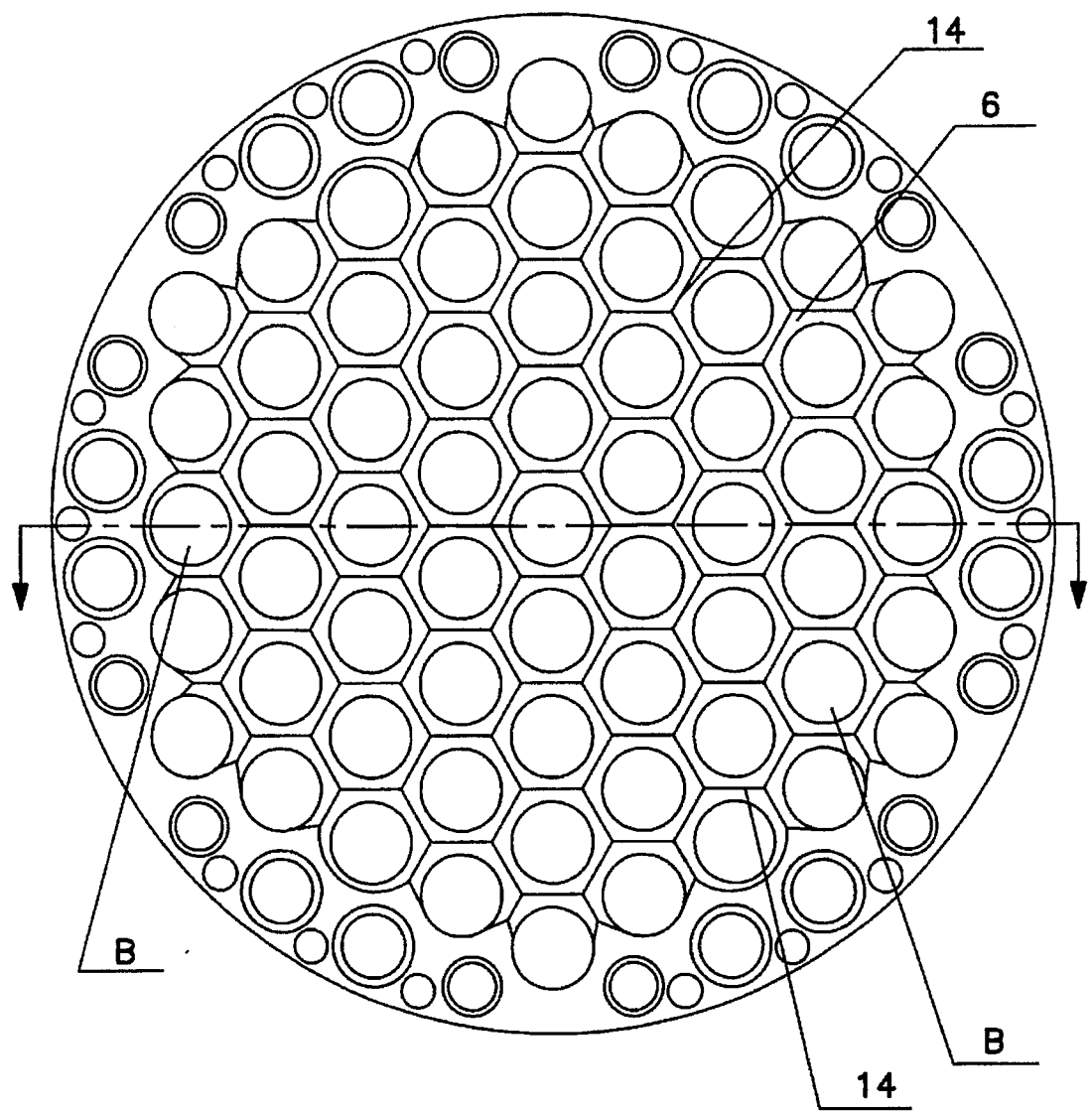
FIG. 2 a top view of the supporting plate of FIG. 1, viewed form the direction of the filter.
Figure 3:
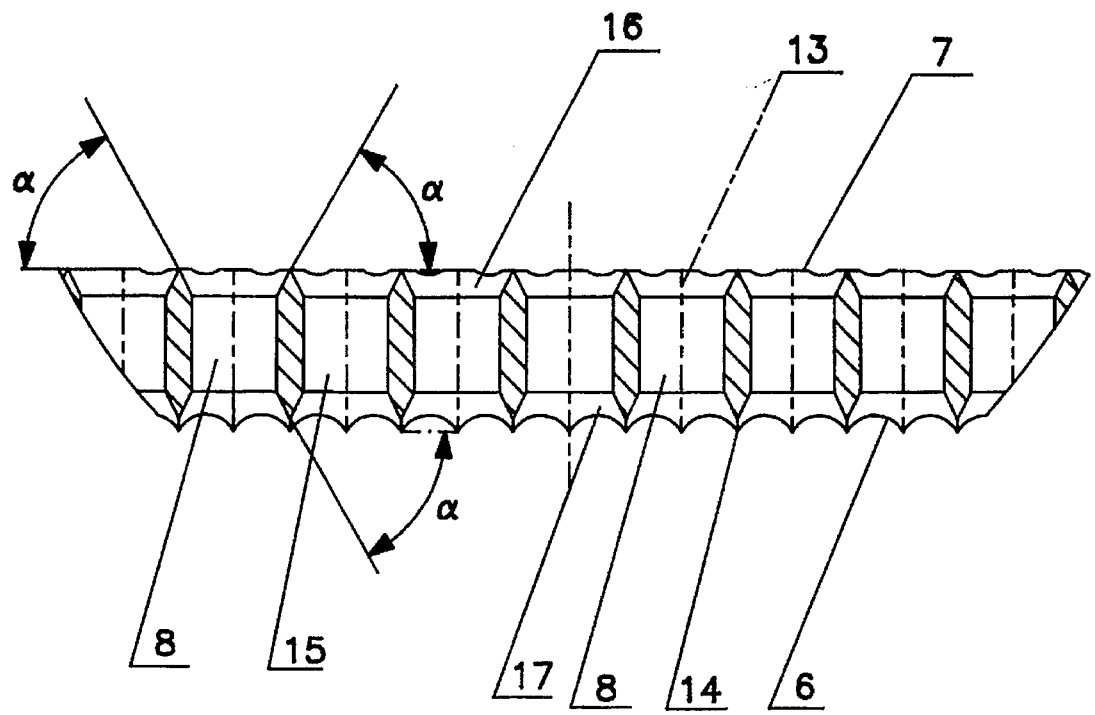
FIG. 3 a sectional view through the supporting plate shown in FIG. 2 along line A–B.
Figure 3A:
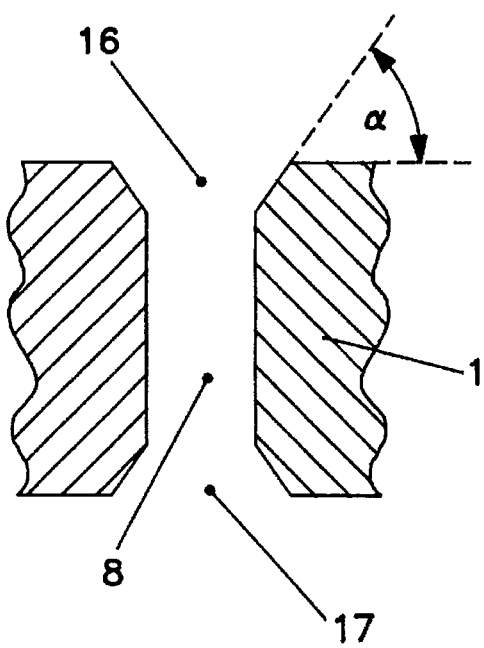
FIG. 3(a) shows a truncated cone configuration.
Figure 4:
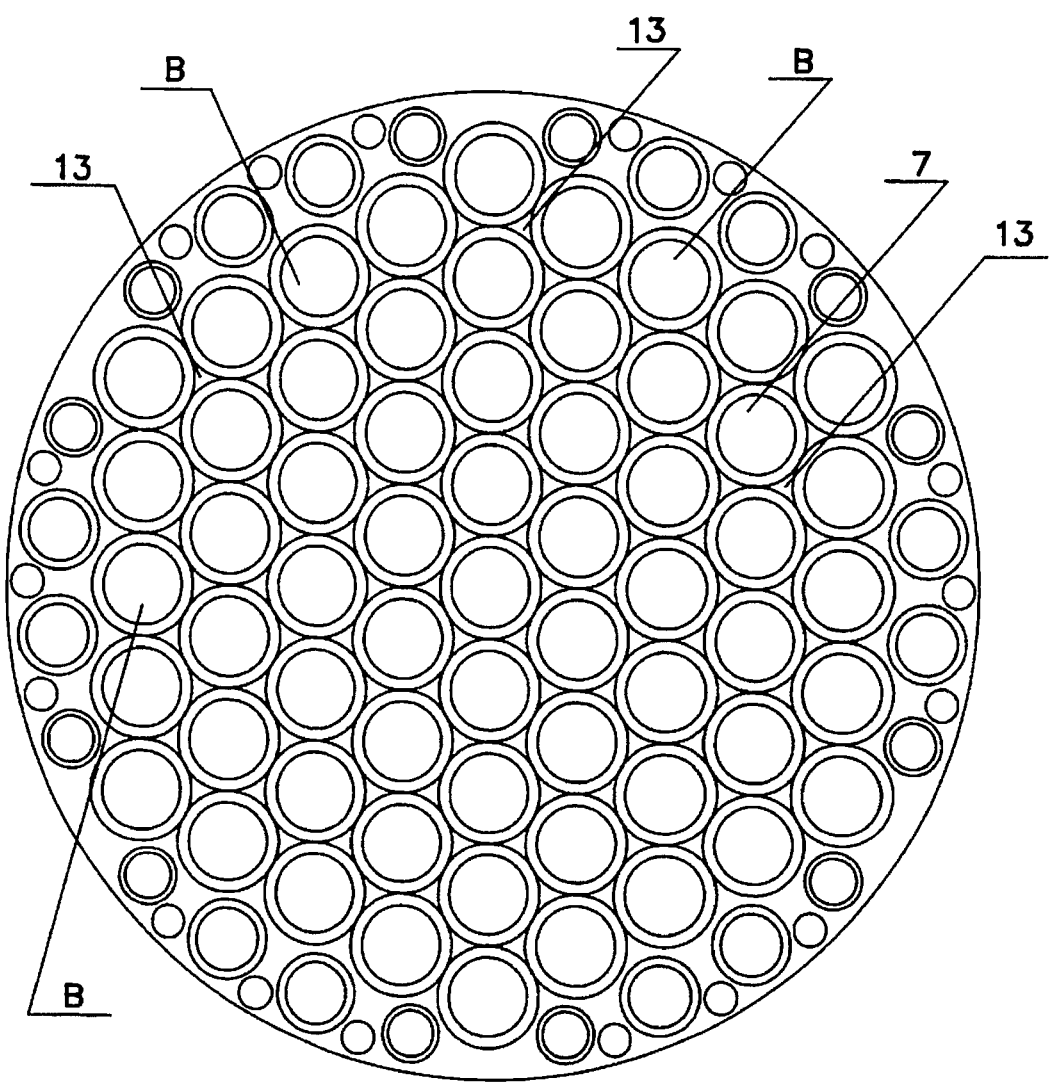
FIG. 4 a top view of the supporting plate shown in FIG. 2 from the other side.

The supporting plate comprises a front side 6 and a rear side 7, whereby the top view according to FIG. 2 depicts the front side 6 of supporting plate 1 and the top view according to FIG. 4 the rear view 7 of supporting plate 1. The supporting plate 1 contains a large number of holes 8, which pass through the supporting plate from the front side 6 to the rear side 7, and from which large number only some exemplary holes in FIGS. 1 to 4 have been marked. In the flow direction 3 of the fluid to be filtered a filter 9 is arranged distally from the supporting plate 1 (FIG. 1), whereby the FIG. 1 shows one single filter 9, although it is obvious that this filter 9 may also be a set of filters, in particular two to six different filters.

Downstream in flow direction 3 behind the filter 9 a filter distance plate 10 has been arranged, which on its part is supported by a perforated plate 11. The perforated plate 11 possesses holes 12, to the effect that the filtered fluid leaves the filter device downstream from the perforated plate 11 in the direction of arrow 4.

At the moment when the filter 9 is clogged with dirt particles and other contaminants, the fluid stream is diverted by guidance or control elements not shown, in such a way, that in this regeneration mode the fluid reaches the fluid device now from the direction of arrow 5 (FIG. 1). It reaches the perforated plate 11 through the openings 12 and filter 9 through the filter distance plate 10, and the further passage through the holes 8 of the supporting plate 1 has the effect, that the fluid cleans the filter 9 of filtered foreign particles and other contaminants.

In particular in this production mode it is the effect of the supporting plate 1, that the filter 9 is secured and supported and kept safely and permanently in the position as shown in FIG. 1, for which aim a large number of triangular portions of edges 13 (FIG. 4) are touching the surface of the filter 9. Due to the fact, that the total surface of the portions of edges 13 occupy only an area of about 5% of the total surface of the rear side 7 of supporting plate 1, no dead spaces are being formed, and the total occupied surface of filter 9 is washed during the regeneration previously described.

The supporting plate 1 comprises at the level of the front side 6 only edges 14 shaped like lines, which broaden in a roof-like manner to the centre of the supporting plate, as is illustrated in FIGS. 1 and 3.

Each hole 8 in the supporting plate 1 comprises a cylindrical middle zone 15, connected in the direction of the front side 6 with a distal section 17 shaped like a truncated cone and connected in the direction of the rear side 7 of the supporting plate with a distal section 16 which is cone-shaped as well and has the same dimension.

The sidelines of both above-mentioned truncated cones 16 and 17 make an angle α of 60° with the surfaces of the front side and the rear side.

It is particularly clear from FIG. 1, that the supporting plate 1 secures the filter 9 in the flow direction 3 (filtration mode) as well as in flow direction 5 (regeneration mode).

What is claimed is:

1. A supporting plate for a filter provided inside of a fluid filter device being positioned basically perpendicular to the stream direction, whereby, relative to the stream direction of the fluid to be filtered, said filter is on one side in contact with said supporting plate, and is carried on its other side by an apertured plate, and whereby said supporting plate comprises a plurality of holes which extend from a front side (6) to a back side (7) of the supporting plate, and each hole (8) defines in the area of said front side (6) and in the area of said back side (7) a distal section (16, 17), which is widened relative to the smallest cross-section of the hole (8), whereby said distal section (16,17) is of such a shape that the total surface of edges (13,14) between the holes (8) is decreased, whereby the supporting plate (1) contains on the back side (7) directed to the filter (9) at an outer surface of the back side (7) only mainly triangular-like base areas of the edges (13) and on the front side (6) directed away from the filter (9) at an outer surface of the front side (6) only line-shaped edges (14).

2. The supporting plate according to claim 1, whereby each hole (8) provides a distal section (17) directed to the front side (6) of the supporting plate (1) in the shape of a truncated cone and a distal section (16) directed to the back side (7) of the supporting plate (1) in the shape of a truncated cone.

3. The supporting plate according to claim 2, whereby each hole (8) comprises a cylindrical middle section (15) between the distal sections (16, 17) shaped like a truncated cone.

4. The supporting plate according to claim 3, whereby the diameter of the cylindrical middle section corresponds to the adjacent diameter of each of the truncated cones (16, 17).

5. The supporting plate according to claim 17, whereby the edges (13, 14) are formed as portions of edges (13), whereby these portions of edges (13) are in direct contact with the filter (9) and support the filter (9) in this way.

6. The supporting plate according to claim 1, whereby each hole (8) has on the front side (6) as well as the back side (7) of the supporting plate (1) said increased distal section (16,17).

7. The supporting plate according to claim 1, whereby the edges (14) or the portions of edges (13) provide a total surface on the outer surface of the front side (6) or the back side (7) which is between 30% and 2%, relative to the total surface of the front side (6) or the back side (7).

8. The supporting plate according to claim 1, whereby the edges (14) or the portions of edges (13) provide a total surface on the outer surface of the front side (6) or the back side (7) which is between 15% and 5%, relative to the total surface of the front side (6) or the back side (7).

9. The supporting plate according to claim 1, whereby the portions of edges provided on the outer surface of the front side (6) or the back side (7) have a triangular base area.

10. The supporting plate according to claim 2, whereby both distal sections (16,17) have bases shaped like a truncated cone that meet each other and constitute the hole (8).

11. The supporting plate according to claim 2, whereby the sides of the truncated cone (16,17) make an angle $\alpha$ between 50° and 70° relative respectively to the front side or relative to the back side.

12. The supporting plate according to claim 1, whereby said holes (8) comprise side walls in the stream direction (3) of said fluid with a double-concave shape.

13. The supporting plate according to claim 1, whereby the supporting plate (1) contains a first row of holes (8) directly adjacent to the side of the supporting plate and whereby the arrangement of the other holes (8) is of such a design, that each hole (8) is surrounded by six other holes (8).

14. The supporting plate according to claim 1, whereby the supporting plate (1) has a polygon shape.

* * * * *